United States Patent
Svelto et al.

[11] Patent Number: 5,956,173
[45] Date of Patent: Sep. 21, 1999

[54] CAPILLARY COMPRESSOR

[75] Inventors: Orazio Svelto, Segrate; Sandro De Silvestri, Milan; Mauro Nisoli, Bergamo, all of Italy

[73] Assignee: Consiglio Nazionale delle Ricerche, Rome, Italy

[21] Appl. No.: 08/852,437

[22] Filed: May 7, 1997

[51] Int. Cl.$^6$ .................... G02F 1/16; H01P 3/12
[52] U.S. Cl. .................. 359/332; 359/341; 359/343; 385/3
[58] Field of Search .................. 359/252, 332, 359/341, 342, 343; 385/1, 3, 36, 37

[56] References Cited

U.S. PATENT DOCUMENTS

| | | | |
|---|---|---|---|
| 3,558,891 | 1/1971 | Kaiser | 359/332 |
| 4,588,957 | 5/1986 | Balant et al. | 359/332 |
| 4,913,507 | 4/1990 | Stamnitz et al. | 359/341 |

OTHER PUBLICATIONS

Nisoli et al, Optics Letters, vol. 22, #81 pp. 522–524, Apr. 15, 1997; abstract only herewith.

Castillejo et al, Applied Physics B, vol. B45, #4, pp. 293–299, Apr. 1988; abst. only herewith.

*Primary Examiner*—Nelson Moskowitz
*Attorney, Agent, or Firm*—Cumpston & Shaw

[57] ABSTRACT

Our invention achieves spectral broadening of an input pulse by propagating it through a hollow fiber filled with a noble gas. The output pulse is then compressed to a shorter duration by passing it through an optical system consisting of phase dispersive elements. In a preferred embodiment, the input pulse is generated by a mode-locked laser, amplified and then subsequently compressed to produce an input pulse of high peak power. This input pulse is then focused into a hollow cylindrical fiber made of fused silica and mounted inside a pressure vessel filled with noble gas. The optics are designed to match the spatial mode volume of the input pulse to that of the entrance aperture of the hollow fiber. Light is constrained to propagate down the hollow fiber and generates additional bandwidth through self-phase modulation as it interacts with the gas contained therein. The spectrum of the pulse after propagation through the gas is frequency chirped. A portion or all of this bandwidth is then compressed using prisms to produce a laser pulse of shorter duration than the input pulse.

31 Claims, 2 Drawing Sheets

CAPILLARY COMPRESSOR

FIELD OF THE INVENTION

This invention relates to the generation of a laser pulse of extremely short duration (typically much less than 100 fs) and high peak power. More specifically it relates to the creation of additional compressible bandwidth by propagating an input pulse through a hollow waveguide filled with a noble gas and subsequent compression using phase dispersive optical elements.

BACKGROUND OF THE INVENTION

Compression of frequency chirped ultrashort laser pulses can create pulses of high peak power and short pulse duration. In particular, pulses down to the record value of 6 femtoseconds (fs) can be obtained from 50 fs pulses out of a mode-locked dye laser by self-phase modulation in a single-mode optical fiber and subsequent chirp compensation using suitable phase dispersive elements. The use of single-mode fibers is, however, limited to low energy (nanoJoule) pulses due to both damage of the material and the appearance of higher-order nonlinearities that introduce distortions on the pulse which cannot be easily compensated.

The recent availability of femtosecond pulses of high energy, microJoules, milliJoules and even Joules, from solid state lasers systems calls for a new pulse spectral broadening technique. So far, spectral broadening of high energy femtosecond pulses has only been accomplished by unguided propagation in bulk materials. Except for low energy pulses, unguided propagation in bulk materials leads to filamentation of the spatial mode and thus poor spatial mode quality. Additionally, the nonuniform transverse intensity profile of the beam leads to nonuniform transverse self-phase modulation. As a consequence, effective pulse compression of these pulses can only be achieved using the central and more uniform fraction of the beam profile.

There is a commercial need for sources of high peak power laser pulses that have a pulse duration shorter than the duration of the effect being studied, and/or shorter than the process being induced by the interaction of these short laser pulses with matter. It is especially important in the field of chemistry, for example, to generate pulses of extremely short duration at specific wavelengths that correspond to the electronic vibrational state of the sample being studied. The present modality for producing these extremely short pulses is to start by creating pulses of approximately the desired duration in a Ti:Sapphire laser oscillator, and amplify them in a multipass amplifier, regenerative amplifier, or chirped pulse amplifier. Products for generating such pulses are commercially available. See for example, 20 femtoseconds pulse width produced in a modified version of the Clark-MXR, Inc., Model NJA-5 Ti:Sapphire Laser Oscillator, the Clark-MXR, Inc., Model CPA-1000 Ti:Sapphire Regenerative Amplifier incorporating a spectral filter as described in U.S. Pat. No. 5,592,327 to suppress gain. The complexity of this approach combined with the increased number of components that depend on nonlinear processes as well as their sensitivity to environmental changes makes these systems extremely sensitive to even small environmental changes.

Our invention offers a novel technique for generating the additional bandwidth needed to create pulses of high energy with good spatial mode quality. It uses a guiding element for confining the propagation of an input pulse to a large single mode diameter and thus maintains a high quality spatial mode profile on the beam as it propagates over long interaction lengths. It uses a fast non-linear medium for generation of the additional spectral bandwidth needed to create a pulse whose width is shorter than that of the input pulse, yet at the same time has a high threshold for multiphoton ionization and consequently low absorption. It can be employed as an add-on to existing ultrashort, high energy sources operating in a pulse width regime of substantially longer duration, and is thus less sensitive to environmental perturbations. Lastly, it is scaleable to extremely high peak powers—which opens up the possibility of performing new experiments in high-field light/matter interactions.

BRIEF DESCRIPTION OF THE INVENTION

Briefly described, our invention achieves spectral broadening of an input pulse by propagating it through a hollow fiber filled with a noble gas. The output pulse is then compressed to a shorter duration by passing it through an optical system consisting of phase dispersive elements. In a preferred embodiment of our invention, the input pulse is generated by a mode-locked laser, amplified and then subsequently compressed to produce an input pulse of high peak power (techniques for generating suitable high peak power input pulses are known to those skilled in the art, and in many forms are commercially available. See for example the Clark-MXR, Inc., Model NJA-5 Ti:Sapphire laser oscillator and Model CPAS 1000 Ti:Sapphire Regenerative Amplifier). This input pulse is then focused into a hollow cylindrical fiber made of fused silica and mounted inside a pressure vessel filled with noble gas. The optics are designed to match the spatial mode volume of the input pulse to that of the entrance aperture of the hollow fiber. Light is constrained to propagate down the hollow fiber and generates additional bandwidth through self-phase modulation as it interacts with the gas contained therein. The spectrum of the pulse after propagation through the gas is frequency chirped. A portion or all of this bandwidth is then compressed using prisms to produce a laser pulse of shorter duration than the input pulse. Using this technique, pulse width compression factors of 14 with energy loss of a factor of 3 have been demonstrated—leading to a net increase in peak power of 4.6 times the peak power of the input pulse.

Accordingly, it is an object of the present invention to compress optical pulses to a pulse width whose duration is shorter than their original pulse width.

It is a further object of the present invention to compress high power optical pulses to a pulse width whose duration is shorter than their original pulse width.

It is a still further object of the present invention to create optical pulses with high peak power out of optical pulses with lower peak power.

It is a still further object of the present invention to create optical pulses with high peak power without causing material damage.

It is a still further object of the present invention to create high peak power optical pulses with good spatial mode quality.

It is a still further object of the present invention to create high peak power optical pulses that can be focused to a small spot.

BRIEF DESCRIPTION OF THE DRAWINGS

The foregoing and other objects, features, and advantages of the invention, as well as a presently preferred embodiments thereof, will become more apparent from a reading of the following description in connection with the accompanying drawings in which.

DETAILED DESCRIPTION OF THE INVENTION

Figure 1:
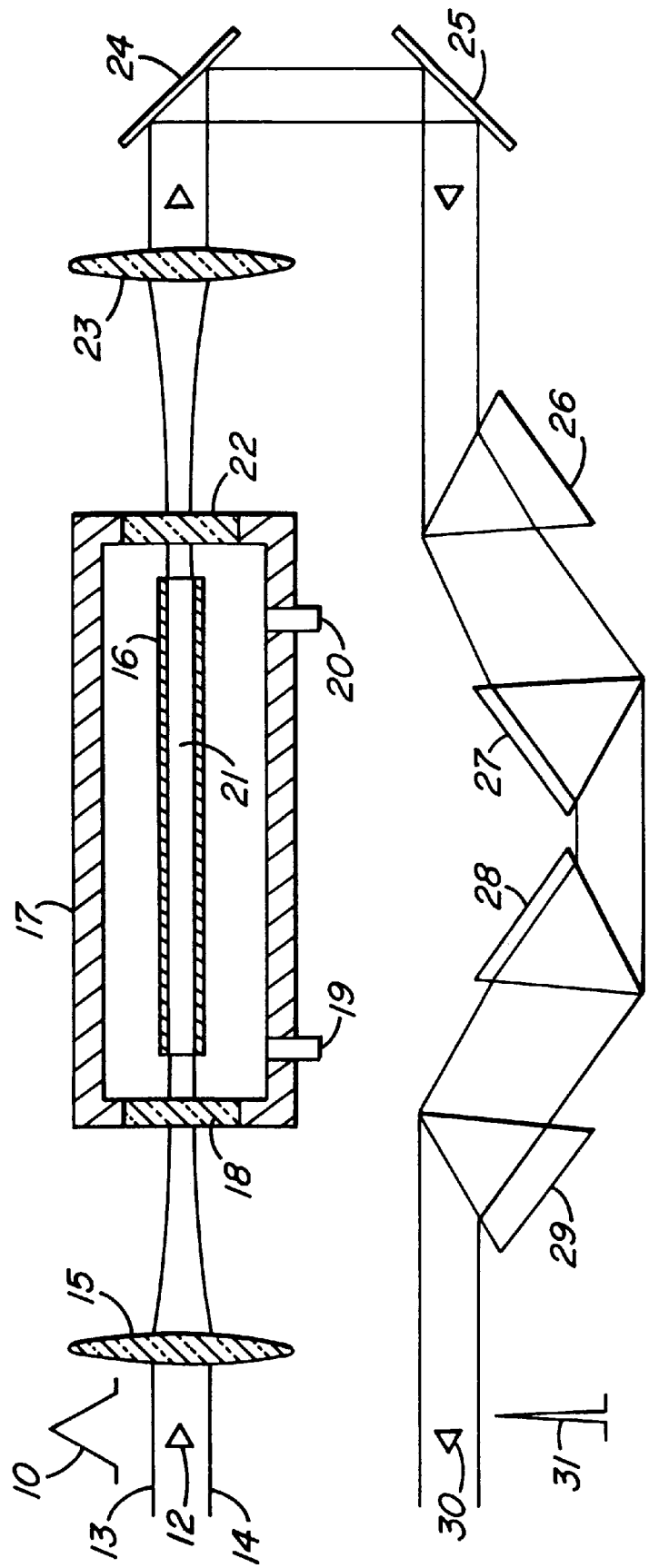
FIG. 1 is an illustration of apparatus for generating short pulses in accordance with a preferred embodiment of the invention.

Referring first to FIG. 1 there is shown an input pulse of ultrashort duration represented illustratively by a triangle shape, 10. In a preferred embodiment the duration of the input pulse is 140 fs FWHM, and the pulse 10 has a pulse energy of 660 microJoules at a wavelength of 780 nm. Sources of pulses possessing these characteristics such as a Clark-MXR, Inc., Model CPA-1000 Ti:Sapphire Regenerative Amplifier are readily available commercially and will not be further described here. The use of specific values for parameters in the foregoing description is intended to be illustrative only and should not be taken as limiting the scope of the invention. Those skilled in the art will recognize that quantitative variations on the parameters are possible without substantially affecting the qualitative performance of the invention taught herein. Other sources of pulses are also possible. For example, an amplifier of the multipass type also known to those skilled in the art could produce pulses with sufficient energy and substantially shorter pulse duration—and would provide useful input pulses to this invention. How the pulses are produced is not relevant to the scope of our invention. All that is required is that the input pulse have sufficient peak power to generate additional compressible bandwidth through self-phase modulation.

This input pulse propagates from left to right as illustratively shown in FIG. 1 by the solid arrowhead, 12. The pulse has a finite beam size as shown by the horizontal lines 13 and 14.

The input pulse, 12, is focused by a lens 15, such as a BK7 glass or fused silica lens having a focal length of about 30 cm, through a transparent window 18 and into a hollow cylindrical waveguide 6, housed inside a pressure chamber, 7. The focal length of the lens is selected to optimize mode matching with the cylindrical waveguide. In a preferred embodiment, the hollow waveguide is fabricated of fused silica hollow fiber which can be obtained for example from Southampton University in Southampton, United Kingdom, and has an internal bore diameter of 140 microns and an overall length of 70 cm. The diameter is selected to keep the energy density low enough to minimize ionization of the gas in the waveguide, but not so large that self phase modulation is prevented. The length of the tube is selected to discriminate against higher order modes of oscillation. The pressure chamber 17 housing this hollow waveguide 16 is first evacuated and then filled with a noble gas such as krypton at a pressure two atmospheres (atm) through gas inlet and outlet ports 19 and 20. By properly mode matching the input beam 12, to the $EH_{11}$ mode of the hollow waveguide 16, it is possible to maintain a high quality spatial mode throughout the length of the fiber. Wave propagation along the hollow waveguide 16 can be thought of as occurring through grazing incidence reflections at the inner surface of the hollow waveguide, 21. Since the losses caused by these multiple reflections greatly discriminate against higher order spatial modes, only the fundamental $EH_{11}$ mode can propagate in a sufficiently long wave guide.

Figure 2:
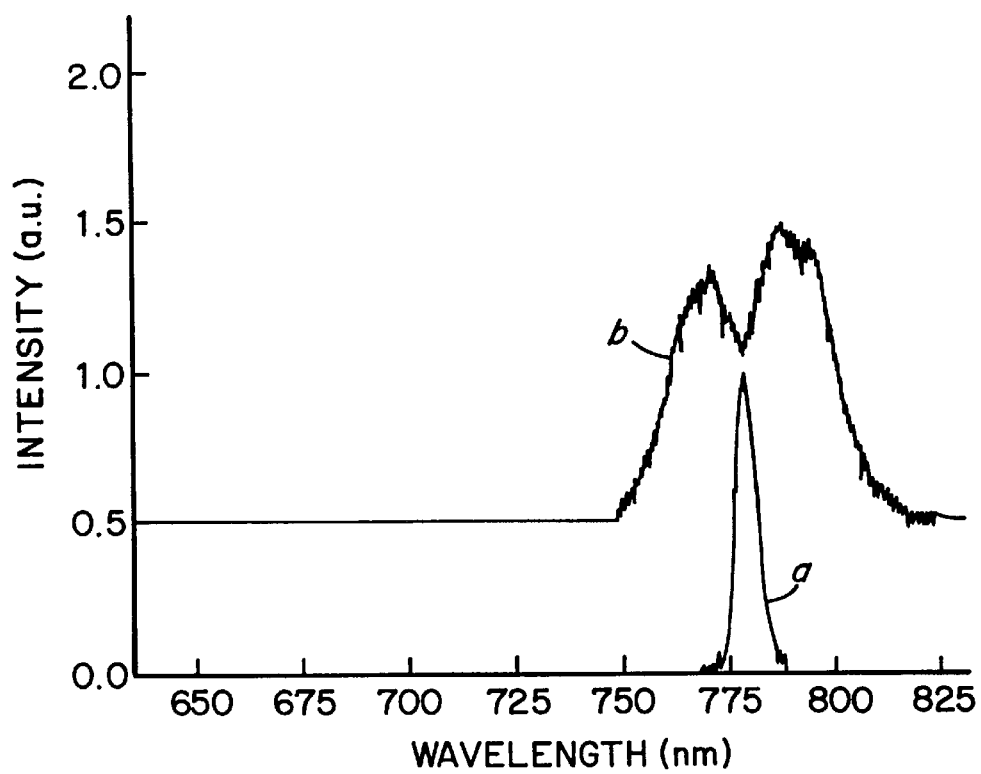
FIG. 2 shows the spectrum of the input pulse superimposed on the spectrum of the output pulse from the hollow cylindrical fiber when the gas inside the pressure chamber is krypton at a pressure of 2 atm.

The input pulse 12 is spectrally broadened by self-phase modulation in the gas inside the hollow waveguide 16 as it propagates down its length. This spectral broadening is shown in FIG. 2, for the case of the preferred embodiment in which the input peak power was 1 GW and the gas was krypton. The spectrum of the input pulse is shown in curve a. The broadened spectrum of the pulse at the end of the hollow waveguide, 16, is shown in curve b.

Again referring back to FIG. 1, upon exiting the pressure chamber 17 through the transparent window 12, the spectrally broaden pulse is recollimated by lens 23. Mirrors 24 and 25 are arranged to reflect this pulse through a sequence of phase dispersive elements 26, 27, 28, and 29. These phase dispersive elements are designed and arranged to compress the pulse to a FWHM value shorter in duration than that of the input pulse 12, as known by those skilled in the art. In the preferred embodiment, these phase dispersive elements are quartz prisms. Other optical elements such as gratings or combinations of prisms and gratings can be used to accomplish the same effect, and at-the same time may help compensate for residual distortions created during the process of spectral broadening.

The shorter duration, higher peak power output pulse is shown exiting prism 19 in FIG. 1 by the arrowhead, 20. This pulse is represented illustratively by a narrowed triangle shape, 21, to have a shorter pulse duration and higher peak power than the input pulse, 1.

Figure 3:
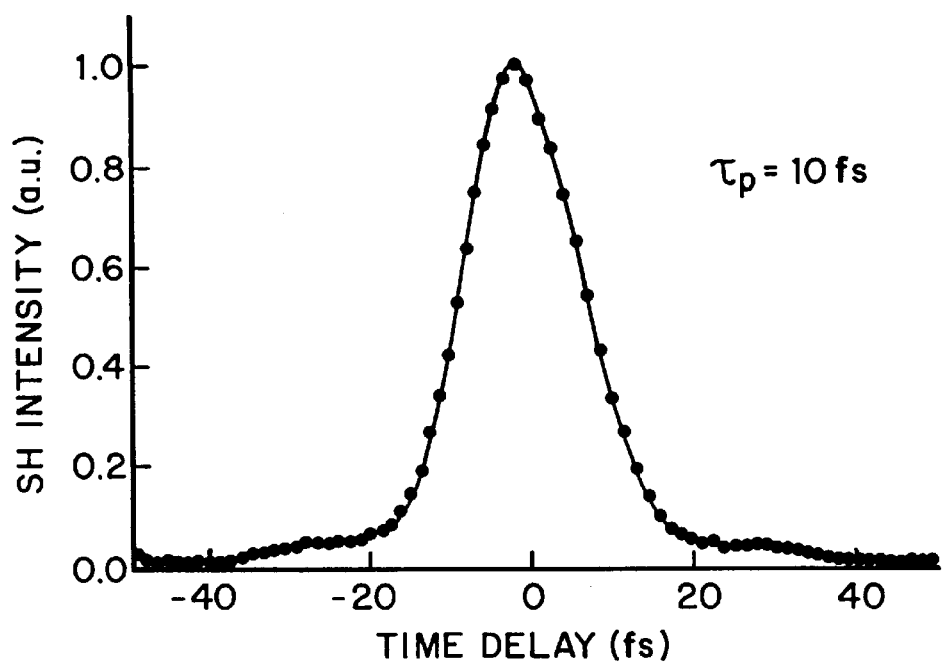
FIG. 3 shows the intensity autocorrelation trace of a pulse showing a reduction of almost a factor of 14 in pulse width.

FIG. 3 shows an autocorrelation trace of a portion of the spectrally broadened and compressed pulse in another preferred embodiment in which the input pulse possessed a peak power of 3.5 GW. The pulse duration is estimated to be 10 fs assuming a $sech^2$ pulse shape. The output pulse peak power is higher by a factor of about 5, and the pulsewidth decreased by a factor of 14.

From the foregoing description it will be apparent that there has been provided an improved means for shortening the pulse width of an energetic optical pulse. This invention possesses the desirable characteristics of maintaining high spatial mode quality, improved peak power, low absorption due to multiphoton ionization and great flexibility as an add-on to existing devices. Variations and modifications in the design that are within the scope of the invention will undoubtedly suggest themselves to those skilled in the art. Accordingly, the foregoing description should be taken as illustrative and not in a limiting sense.

We claim:

1. A generator for generating additional spectral bandwidth comprising:

a hollow waveguide constraining an input pulse to propagate along its length;

a gas inside said hollow waveguide; and a source of input pulses to spectrally broaden said input pulse by self-phase modulation.

2. A generator for generating additional spectral band with comprising a hollow wave guide comprising a cylinder made of dielectric material constraining an input pulse to propagate along its length; a gas inside said cylinder made of dielectric material; and a source of input pulses to spectrally broaden said input pulses by self-phased modulation.

3. The device of claim 1 in which said source of input pulses comprises a mode-locked oscillator seeding an amplifier comprising elements selected from a group consisting of a regenerative amplifier, a multipass amplifier or a chirped pulse amplifier.

4. The device of claim 1 in which said hollow waveguide is a cylinder made of metallic material.

5. The device of claim 1 in which said gas is selected from one of the group consisting of Helium, Neon, Argon, Krypton, or Xenon.

6. The device of claim 2 in which said hollow waveguide is a cylinder made of fused silica.

7. A generator for generating high peak power optical pulses comprising:
   a source of input pulses;
   a hollow waveguide constraining said input pulse to propagate along its length;
   a gas inside said hollow waveguide to spectrally broaden said input pulse through self-phase modulation;
   phase dispersive elements for compressing said spectrally broadened pulse.

8. The device of claim 7 in which said source of input pulses comprises a mode-locked oscillator.

9. The device of claim 7 in which said source of input pulses comprises a mode-locked oscillator seeding an amplifier comprising elements selected from a group consisting of a regenerative amplifier, a multipass amplifier or a chirped pulse amplifier.

10. The device of claim 7 in which said hollow waveguide is a cylinder made of a dielectric material.

11. The device of claim 7 in which said hollow waveguide is a cylinder made of metallic material.

12. The device of claim 7 in which said gas is selected from one of the group consisting of Helium, Neon, Argon, Krypton, or Xenon.

13. The device of claim 7 in which the phase dispersive elements are selected from a group comprising a prism or a grating, or a material with negative group velocity dispersion.

14. The device of claim 10 in which said hollow waveguide is a cylinder made of fused silica.

15. A generator for generating high peak power optical pulses comprising:
    a source of input pulses;
    optical elements for focusing said input pulses into a hollow waveguide;
    a hollow waveguide constraining said input pulse to propagate along its length;
    a gas inside said hollow waveguide to spectrally broaden said input pulse through self-phase modulation;
    phase dispersive elements for compressing said spectrally broadened pulse to a pulse width less than the pulse width of the input pulse.

16. The device of claim 15 in which said source of input pulses comprises a mode-locked oscillator.

17. The device of claim 15 in which said source of input pulses comprises a mode-locked oscillator seeding an amplifier comprising elements selected from a group consisting of a regenerative amplifier, a multipass amplifier or a chirped pulse amplifier.

18. The device of claim 15 in which said optical elements for focusing said input pulses comprises one of a group of elements consisting of a lens or a mirror.

19. The device of claim 15 in which said hollow waveguide is a cylinder made of a dielectric material.

20. The device of claim 16 in which said hollow waveguide is a cylinder made of metallic material.

21. The device of claim 15 in which said gas is selected from one of the group consisting of Helium, Neon, Argon, Krypton, or Xenon.

22. The device of claim 15 in which the phase dispersive elements are selected from a group comprising a prism or a grating, or a material with negative group velocity dispersion.

23. The device of claim 19 in which said hollow waveguide is a cylinder made of fused silica.

24. A method for spectrally broadening a mode locked pulse comprising:
    propagating said pulse mode locked pulse inside and along the length of a hollow wave guide filled with a gas, said gas producing spectral broadening of the mode locked input pulse due to self-phase modulation.

25. A method for generating higher peak power pulses comprising:
    generating an input pulse characterized by a pulse width;
    propagating said input pulse inside and along the length a hollow waveguide filled with a gas, said gas producing spectral broadening of the input pulse due to self-phase modulation;
    compressing said spectrally broadened pulse to a pulse width less than the pulse width of the input pulse.

26. A method for generating higher peak power pulses comprising:
    generating an input pulse characterized by a pulse width;
    focusing said input pulse into a hollow waveguide;
    propagating said input pulse inside and along the length of a hollow waveguide filled with a gas, said gas producing spectral broadening of the input pulse due to self-phase modulation;
    compressing said spectrally broadened pulse to a pulse width less than the pulse width of the input pulse.

27. A method for increasing the peak power of a laser pulse comprising:
    generating an input pulse characterized by a first pulse width;
    self phase modulating the input pulse by propagating substantially only the $EH_{11}$ mode through a gas to spectrally broaden the input pulse; and
    compressing the spectrally broadened pulse to a second pulse width less than the first pulse width.

28. The method of claim 27 in which propagating substantially only the $EH_{11}$ mode through a gas comprises propagating the pulse through a generally cylindrical volume of gas.

29. The method of claim 28 in which propagating the pulse through a generally cylindrical volume of gas comprises propagating the pulse through a gas filled tube.

30. The method of claim 29 in which propagating the pulse through a gas filled tube comprises propagating the pulse through a tube from a material having an index of refraction less than the index of refraction of the gas.

31. The method of claim 28 in which propagating the pulse through a generally cylindrical volume of gas comprises propagating a pulse through a Noble gas.

* * * * *